Figure 1:
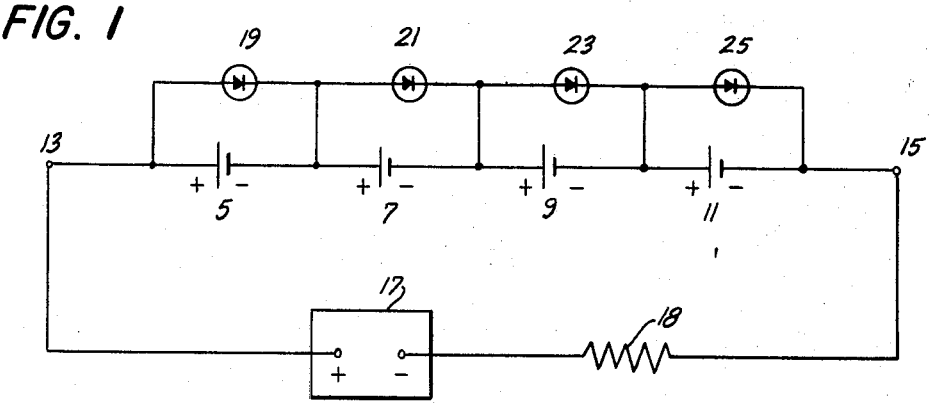

Sept. 8, 1964     J. M. BOOE ETAL     3,148,322
RECHARGEABLE BATTERY WITH MEANS TO PREVENT OVERCHARGING
Filed March 13, 1961

INVENTORS
JAMES M. BOOE
WALLACE D. LOFTUS
ROBERT E. RALSTON
BY
Nicholas Panuzio
ATTORNEY

United States Patent Office 3,148,322
Patented Sept. 8, 1964

3,148,322
RECHARGEABLE BATTERY WITH MEANS TO
PREVENT OVERCHARGING
James M. Booe, Wallace D. Loftus, and Robert E. Ralston,
Indianapolis, Ind., assignors to P. R. Mallory & Co.,
Inc., Indianapolis, Ind., a corporation of Delaware
Filed Mar. 13, 1961, Ser. No. 95,291
6 Claims. (Cl. 320—43)

This invention relates to rechargeable electric batteries, and particularly concerns a rechargeable battery which includes means for preventing overcharge of any of a group of serially connected rechargeable cells contained therein.

A major problem encountered in recharging electric storage cells and batteries is that of terminating the charging current once all the electrodes have been fully reconstituted. If charging is continued beyond that point, gases are liberated at the electrodes at the expense of the electrolyte. In open or vented cells these gases can escape, although there will be some damage to the electrodes which can become significant if the overcharge is prolonged or recurs successively. In hermetically sealed cells and batteries, however, this is a much more acute problem since the liberated gases will accumulate within the casing and can eventually cause it to rupture or explode. It is therefore imperative to avoid overcharging of sealed cells and batteries.

The condition of full charge of an electric storage cell corresonds to a fairly well defined maximum terminal voltage. Application of a direct supply voltage of slightly greater value across the terminals of the cell for a sufficient time will therefore effect full recharge. If a higher voltage is applied for a longer period the terminal voltage will rise into the overcharge region and gas generation will occur in the cell. Although it is necessary to avoid this for the reasons stated, it is difficult to do so when recharging a battery comprising a number of cells connected in series. Due to inevitable slight variations in the electrochemical capacities of the cells, some will become discharged to a greater extent than others while the battery is in service. Consequently, when the battery is recharged those cells will require a longer period than the others to come up to full charge. Since recharging is continued until the terminal voltage of the battery reaches the sum of the voltages corresponding to full charge of all of the cells therein, at least some cells will be subjected to different degrees of overcharge and undergo gas generation. Series recharging of sealed cells and batteries has therefore been regarded as impractical except with certain specific types of cells wherein the electrochemical system is itself capable of absorbing any liberated gases. This is not true of many types of cells which have superior characteristics in other respects.

Accordingly, an object of the invention is to provide means by which a plurality of electric storage cells may be serially recharged without danger of becoming overcharged and without altering the normal electrochemical system of any of the cells.

A further object is to provide an electric storage battery including means contained within the normal battery casing for preventing overcharge of any of the cells therein during serial recharging to full voltage.

A further object is to provide an electric storage battery including voltage-sensitive protective means for diverting charging current supplied to the battery around any cell therein when the terminal voltage of such cell has reached the level corresponding to full charge thereof.

A rechargeable electric storage battery in accordance with the invention comprises a plurality of rechargeable electric cells which respectively produce predetermined maximum terminal voltages upon attaining the fully charged condition. It further includes means connecting the cells in series additive relationship to form a battery, terminal means being provided by which a charging voltage may be applied across the series combination of all cells at least equal to the sum of the foregoing maximum terminal voltages thereof. The battery additionally comprises a plurality of voltage-sensitive current gating means respectively shunting the cells, each such gating means being substantially nonconductive when the terminal voltage of the cell shunted thereby is below its predetermined maximum value and becoming highly conductive when the cell terminal voltage incrementally exceeds that value. As a result, charging current supplied to the battery is bypassed by the gating means around any cell which has attained the fully charged condition and overcharge thereof is prevented. Preferably, the voltage-sensitive gating means referred to are diode semiconductor devices which may readily be included within the normally employed battery casing containing the cells, no additional space being required. Such a device may be adapted to remain substantially nonconductive until the voltage there-across incrementally exceeds a characteristic threshold level substantially the same as the predetermined maximum terminal voltage of the cell shunted thereby, the device then becoming highly conductive.

Figure 2:
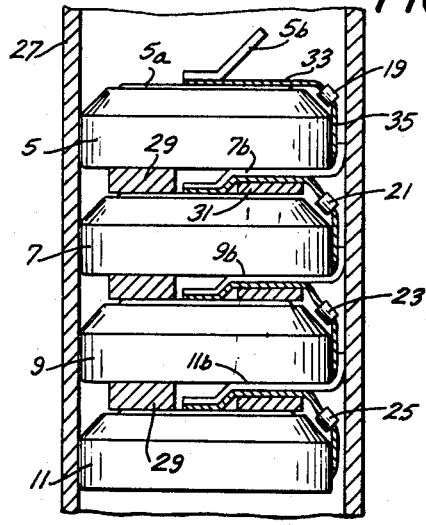
Figure 3:
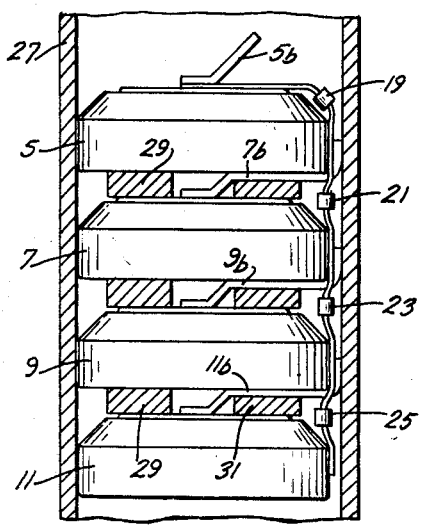

A more detailed description of the invention, together with further objects and features thereof, is presented in the following specification and accompanying drawings in which:

FIG. 1 is a circuit diagram of a rechargeable electric storage battery in accordance with the invention; and FIGS. 2 and 3 are two different physical configurations which may be employed for the battery arrangement of FIG. 1.

Referring to FIG. 1, the rechargeable electric storage battery there illustrated comprises a plurality of rechargeable electric cells 5, 7, 9 and 11 which respectively produce predetermined maximum terminal voltages upon attaining the fully charged condition. That is, in all electric cells the no-load open circuit terminal voltage is appreciably lower than the voltage which must be established across the terminals in order to bring the cell up to full charge. This excess is known as overvoltage, and is produced at the cell electrodes even though no gas liberation occurs. Upon cessation of charging the overvoltage gradually decays until the terminal voltage reaches the normal no-load level. Accordingly, the applied charging voltage must at least equal the sum of the no-load cell voltages plus the overvoltages if full recharge is to be realized. For example, a lead-acid battery has an open circuit potential of 2.14 volts for each cell but it is necessary to apply a charging voltage of 2.2 or sometimes 2.3 volts per cell to obtain full recharge. A rechargeable mercury cell of the type containing a depolarizer comprising a mixture of silver and mercuric oxide has an open circuit potential of about 1.35 volts. However, to attain complete conversion of the mercury produced during discharge back to mercuric oxide the charging voltage employed must be about 1.7 volts. In fact, it is sometimes desirable to apply an even higher voltage to convert some of the silver to silver oxide, in which case the charging voltage may be as high as 1.96 volts before gas generation occurs. As further examples, the open circuit potential of a nickel-cadmium cell is 1.3 volts but its maximum permissible charging voltage is 1.49 volts. The open circuit potential of a zinc-silver oxide cell is 1.58 volts but its maximum permissible charging voltage is 1.96 volts. It should therefore be understood that the "maximum terminal voltage" referred to in this specification and in the ensuing claims is the voltage produced across the cell terminals when it has been charged to a point just before the onset of gas liberation at the electrodes. As explained, the value of this voltage is characteristic of the type of cell involved and is known or can be determined in advance.

As shown in FIG. 1, means in the form of electrical conductors are provided for connecting the positive electrode of each cell to the negative electrode of the succeeding cell so that all cells are connected in series additive relation to form a battery. The positive electrode of first cell 5 and the negative electrode of last cell 11 are connected to respective terminals 13 and 15 of the complete battery, so that a charging voltage may be applied across the series combination of all cells at least equal to the sum of the maximum terminals voltages thereof. Such a charging voltage may be supplied from a direct current source 17 which has its positive and negative terminals respectively connected to the positive and negative battery terminals 13 and 15. A resistor 18 may be included in series with source 17 of sufficient resistance to limit the charging current to a safe level even when the battery is fully discharged. If all cells are hermetically sealed rechargeable mercury cells, each having a maximum terminal voltage of 1.7 volts corresponding to attainment of the fully charged condition, the charging voltage would have to be at least four times that value or 6.8 volts in order to effect full recharge. Except for the improvement wrought by the present invention the applied voltage would have to be accurately maintained at substantially that value. However, as will become apparent from the ensuing description the invention permits the applied voltage to be considerably in excess of the sum of the maximum terminal voltages of the cells involved. The invention therefore enables much simpler and less expensive charging equipment to be employed.

The embodiment of the invention shown in FIG. 1 further comprises a plurality of voltage-sensitive current gating means 19, 21, 23 and 25 respectively shunting cells 5, 7, 9 and 11. Each such gating means is substantially nonconductive when the terminal voltage of the cell shunted thereby is below its predetermined maximum value, but becomes highly conductive when the cell terminal voltage incrementally exceeds that value. In this way, charging current supplied to the battery from source 17 is bypassed around any cell which has attained the fully charged condition and overcharge thereof is prevented. More specifically, each such gating means may be a two-terminal or diode semiconductor device which remains substantially nonconductive when the voltage there-across is below a characteristic threshold level and which becomes highly conductive when the voltage there-across incrementally exceeds that level, the characteristic threshold voltage level of each diode device being substantially the same as the maximum terminal voltage of the cell shunted thereby. Each cell is thereby effectively short-circuited by its shunting diode whenever the cell terminal voltage tends to exceed the level at which gas generation would be initiated, while charging current is permitted to continue to flow through those cells which are still not fully charged.

A diode device of the type described must have a characteristic gating voltage threshold level substantially the same as the maximum terminal voltage of the cell it is to protect. In addition, at the characteristic threshold voltage level of the diode its resistance should drop far below that of the cell shunted thereby. Ideally, the gating characteristic should switch from a very high resistance far exceeding that of the cell to a negligibly low resistance in response to an infinitesimal increase in the voltage across the diode from the characteristic gating voltage level. At the present time the type of semiconductor diode device most closely approximating this type of gating characteristic is the zener diode. Unfortunately, the lowest gating voltage of currently available zener diodes is about 2.6 volts, which is too high to match the maximum terminal voltage corresponding to full charge of any type of electrochemical cell now in use. However, suitable gating performance at lower voltage levels can be obtained by taking advantage of the forward conduction characteristic of semiconductor diode devices such as varistors and PN junction rectifiers. With such devices the forward voltage there-across must exceed a fairly well defined low level before appreciable conduction occurs. This follows from the fact that the forward current I produced by a forward voltage V is approximately given by the exponential relation:

$$I \cong K e^{kV}$$

where $K$ and $k$ are constants at any given temperature and of such values that the current is negligible until the voltage reaches a particular level dependent upon the type of diode involved. For example, selenium varistors have a gating voltage of about 0.5 volt. The gating voltage for silicon PN junction rectifiers is about 0.6 volt; for germanium PN junction rectifiers it is about 0.4 volt; and for gallium arsenide PN junction rectifiers it is about 1.1 volts. Junction rectifiers composed of semiconducting compounds of elements from groups III and V of the periodic table have gating voltages ranging somewhat above and below that for gallium arsenide. By stacking a number of semiconductor diodes of the same or different threshold voltage levels in series, effectively a composite semiconductor diode device can be established having a threshold gating voltage of a selected value. For example, a stack of two silicon rectifiers and one germanium rectifier connected in series provide a composite diode which has a characteristic threshold voltage of about 1.6 volts. A relatively small incremental voltage increase beyond that level will convert such a diode device from the substantially nonconductive state to one of high conductivity.

Referring again to the circuit diagram of FIG. 1, after the charging cycle is completed and source 17 is disconnected, the excess or over-voltage of each cell will discharge through its shunting diode until the normal no-load cell potential is reached. At that point the voltage across the diode will be sufficiently below its gating level so that only negligible discharge current can continue to flow. That is, it would require many days or even weeks for any cell to discharge through its shunting diode. Each of the diodes in FIG. 1 has been illustrated with a circle therearound so as to distinguish it from the symbol for the usual type of diode, since each may actually be a composite stack of conventional semiconductor diodes as noted above.

An important advantage of using semiconductor diode devices in carrying out applicant's invention is that they are of sufficiently small size to be included within the battery casing normally employed to contain all of the cells. This is true even for stacked diode assemblies of the type described. In addition, if the battery casing is hermetically sealed such devices will be fully protected therein without having to be individually hermetically encapsulated. For example, a single PN junction rectifier may be in the form of a tiny wafer or "dice" perhaps .08 inch in diameter and .01 inch in thickness. The dimensions of three such dice stacked together to form a composite gating diode, as suggested above for use with a rechargeable mercury cell, would therefore be only .08 inch in diameter and .03 inch in thickness. Devices of such small size may readily be contained within the battery casing in the spaces between the successive cells therein, as shown by the physical battery assembly in FIG. 2. This comprises a hermetic casing 27 of polystyrene or other electrical insulating material, the cells 5, 7, 9 and 11 being stacked therein one above the other. The exterior shape of each cell corresponds to that of a rechargeable mercury cell of the type disclosed in Patent 2,571,616 issued October 16, 1951 to S. Ruben and Patent 2,712,565 issued July 5, 1955 to F. D. Williams, Jr. The positive terminal of each cell is at the top, as with positive terminal 5a of cell 5, the remainder of the cell casing serving as the negative terminal. Electrically conductive connecting lugs 5b, 7b, 9b and 11b are respectively soldered or welded to the positive terminals of cells 5, 7, 9 and 11, and are sufficiently resilient to effect spring contact with the bottom of the casing of the immediately preceding cell when the cells are forced together. Spacer blocks of polystyrene or other resilient insulating material may be included in the space between successive cells, such as spacers 29 and 31 between cells 5 and 7, for seating the connecting lugs when the stack is assembled together. This assures good electrical contact between each lug and the casing of the cell pressed against it, and also serves to prevent shifting of the cells when the complete battery is subjected to shock or vibration.

Of course, the fully assembled battery would also have covers affixed at each end of casing 27 to tightly retain the cell stack therein, as well as positive and negative exterior terminals respectively connected to lug 5b of the first cell 5 and the cell casing of last cell 11. These well known structural details have not been illustrated inasmuch as the significant structural feature from the standpoint of the invention resides in the mode of attachment of the various diode devices to the respective cells within the battery casing. This is effected, for cell 5 and diode 19, by soldering the positive side of the diode to a thin metallic foil or ribbon 33 which is itself soldered over most of its length to the surface of positive terminal 5a of the cell. The negative side of diode 19 is soldered to another metallic foil or ribbon 35 which is soldered over most of its length to the casing of cell 5. In similar manner, diodes 21, 23 and 25 are connected by respective metallic ribbons to the positive terminal and the casing of each of cells 7, 9 and 11 respectively. In their case the ribbon to the positive cell terminal preferably passes over the spacer block adjacent to the diode before making soldered connection to that terminal.

The mechanical assembly employed in FIG. 2 has the advantage that each cell can be connected to its shunting diode device prior to stacking the cells within battery casing 27. However, from an electrical standpoint it is evident that an assembly such as that shown in FIG. 3 could equally well be employed. This has virtually the same pyhsical arrangement as the battery of FIG. 2, corresponding elements being similarly identified. However, here only the diode 19 for the first cell 5 makes direct connection to the positive terminal of the cell, each of the remaining diodes 21, 23 and 25 simply being strung in series with diode 19 by metallic foil or ribbon soldered to the casing, and thus to the negative terminal, of each of cells 7, 9 and 11. This takes advantage of the fact that the casing of each preceding cell is held in electrical contact with the positive terminal of each succeeding cell by means of the respective connecting lugs 7b, 9b and 11b. Accordingly, by being electrically connected between the casings of the successive cells 7, 9 and 11 the respective diodes subsequent to diode 19 are respectively electrically connected in shunt with those cells.

While the invention has been described with reference to certain specific embodiments thereof it will be apparent to those skilled in the art that many modifications and variations may be made without departing from the true teachings and scope of the invention, which is actually defined by the succeeding claims.

What is claimed is:

1. A rechargeable electric storage battery comprising: a plurality of rechargeable electric cells which respectively produce predetermined maximum terminal voltages upon attaining the fully charged condition; means connecting said cells in series additive relationship to form a battery; terminal means for said battery by which a charging voltage may be applied across said series combination of said cells at least equal to the sum of the maximum terminal voltages thereof; and a plurality of voltage-sensitive current gating means respectively shunting said cells, each of said gating means having such characteristics and polarity as to be substantially nonconductive in the direction of the charging current when the terminal voltage produced across the cell shunted thereby is below its predetermined maximum value and becoming highly conductive in the direction of said charging current when the terminal voltage produced across such cell incrementally exceeds that value; whereby charging current supplied to the battery is bypassed by said gating means around any cell shunted thereby which has attained the fully charged condition and overcharge thereof is prevented.

2. A rechargeable electric storage battery comprising: a plurality of hermetically sealed rechargeable electric cells which respectively produce predetermined maximum terminal voltages upon attaining the fully charged condition; means connecting said cells in series additive relationship to form a battery; terminal means for said battery by which a charging voltage may be applied across said series combination of said cells at least equal to the sum of the maximum terminal voltages thereof; and a plurality of voltage-sensitive current gating means respectively shunting said cells, each of said gating means having such characteristics and polarity as to be substantially nonconductive in the direction of the charging current when the terminal voltage produced across the cell shunted thereby is below its predetermined maximum value and becoming highly conductive in the direction of said charging current when the terminal voltage produced across such cell incrementally exceeds that value; whereby charging current supplied to the battery is bypassed by said gating means around any cell shunted thereby which has attained the fully charged condition and overcharge thereof is prevented.

3. A rechargeable electric storage battery comprising: a plurality of rechargeable electric cells which respectively produce predetermined maximum terminal voltages upon attaining the fully charged condition; means connecting said cells in series additive relationship to form a battery; terminal means for said battery by which a charging voltage may be applied across said series combination of said cells at least equal to the sum of the maximum terminal voltages thereof; a battery casing containing all said cells therein; and a plurality of voltage-sensitive current gating means contained within asid battery casing respectively shunting said cells, each of said gating means having such characteristics and polarity as to be substantially nonconductive in the direction of the charging current when the terminal voltage produced across the cell shunted thereby is below its predetermined maximum value and becoming highly conductive in the direction of said charging current when the terminal voltage produced across such cell incrementally exceeds that value; whereby charging current supplied to the battery is bypassed by said gating means around any cell shunted thereby which has attained the fully charged condition and overcharge thereof is prevented.

4. A rechargeable electric storage battery comprising: a plurality of hermetically sealed rechargeable electric cells which respectively produce predetermined maximum terminal voltages upon attaining the fully charged condition; means connecting said cells in series additive relationship to form a battery; terminal means for said battery by which a charging voltage may be applied across said series combination of said cells at least equal to the sum of the maximum terminal voltages thereof; a battery casing containing all said cells therein; and a plurality of voltage-sensitive current gating means contained within said battery casing respectively shunting said cells, each of said gating means having such characteristics and polarity as to be substantially nonconductive in the direction of the charging current when the terminal voltage produced across the cell shunted thereby is below its predetermined maximum value and becoming highly conductive in the direction of said charging current when the terminal voltage produced across such cell incrementally exceeds that value; whereby charging current supplied to the battery is bypassed by said gating means around any cell shunted thereby which has attained the fully charged condition and overcharge thereof is prevented.

5. A rechargeable electric storage battery comprising: a plurality of rechargeable electric cells which respectively produce predetermined maximum terminal voltages upon attaining the fully charged condition; means connecting said cells in series additive relationship to form a battery; terminal means for said battery by which a charging voltage may be applied across said series combination of said cells at least equal to the sum of the maximum terminal voltages thereof; and a plurality of diode semiconductor devices respectively shunting said cells, each of said diode devices being substantially nonconductive when the voltage thereacross is below a characteristic threshold level and becoming highly conductive when the voltage thereacross incrementally exceeds that level; the characteristic threshold voltage level of each of said diode devices being of substantially the same magnitude and polarity as the predetermined maximum terminal voltage of the cell shunted thereby; whereby charging current supplied to the battery is bypassed by said diode devices around any cell shunted thereby which has attained the fully charged condition and overcharge thereof is prevented.

6. A rechargeable electric storage battery comprising: a plurality of hermetically sealed rechargeable electric cells which respectively produce predetermined maximum terminal voltages upon attaining the fully charged condition; means connecting said cells in series additive relationship to form a battery; terminal means for said battery by which a charging voltage may be applied across the series combination of said cells at least equal to the sum of the maximum terminal voltages thereof; a battery casing containing all said cells therein; and a plurality of diode semiconductor devices contained within said battery casing respectively shunting said cells, each of said diode devices being adapted to be substantially nonconductive when the voltage thereacross is below a characteristic threshold level and to become highly conductive when the voltage thereacross incrementally exceeds that level, the characteristic threshold voltage level of each of said diode devices being of substantially the same magnitude and polarity as the predetermined maximum terminal voltage of the cell shunted thereby; whereby charging current supplied to the battery is bypasesd by said diode devices around any cell shunted thereby which has attained the fully charged condition and overcharge thereof is prevented.

References Cited in the file of this patent

UNITED STATES PATENTS

| 1,325,889 | Curtis | Dec. 23, 1919 |
| 2,624,033 | Jaquier | Dec. 30, 1952 |
| 3,027,466 | Roalef | Mar. 27, 1962 |

FOREIGN PATENTS

| 925,134 | France | Mar. 24, 1947 |